United States Patent [19]
Bader et al.

[11] Patent Number: 5,901,138
[45] Date of Patent: May 4, 1999

[54] PROCESS FOR IMPROVING THE EFFICIENCY OF HIGH PERFORMANCE ROUTING

[75] Inventors: Lance Dana Bader, Cary; David Louis Kaminsky, Chapel Hill; Vachaspathi Peter Kompella, Cary, all of N.C.; Robert Walter Scott, Morgan Hill, Calif.

[73] Assignee: International Business Machines Corporation, Armonk, N.Y.

[21] Appl. No.: 08/748,487

[22] Filed: Nov. 8, 1996

[51] Int. Cl.[6] ........................................................ H04J 1/16
[52] U.S. Cl. ................................................................ 370/229
[58] Field of Search ..................................... 370/229, 230, 370/232, 235, 236, 241, 240, 395

[56] References Cited

U.S. PATENT DOCUMENTS

| | | |
|---|---|---|
| 5,210,740 | 5/1993 | Anzai et al. ............................... 370/232 |
| 5,566,208 | 10/1996 | Balakrishnan ............................ 370/240 |
| 5,590,366 | 12/1996 | Bryant et al. ............................. 370/232 |
| 5,627,970 | 5/1997 | Keshav .................................... 370/232 |
| 5,633,861 | 5/1997 | Hanson et al. ........................... 370/232 |
| 5,650,993 | 7/1997 | Lakshman et al. ...................... 370/236 |
| 5,671,216 | 9/1997 | Subasingha et al. .................... 370/230 |
| 5,719,865 | 2/1998 | Sato ........................................ 370/395 |

OTHER PUBLICATIONS

Andrew W. Tanenbaum, Structured Computer Organization. 11 (2d ed.), 1984.

*Primary Examiner*—Ajit Patel
*Assistant Examiner*—Chiho Andrew Lee
*Attorney, Agent, or Firm*—Jeanine S. Ray-Yarletts

[57] ABSTRACT

A rate based flow and congestion control mechanism for packet communications whereby the acceleration and deceleration of the sending rate is moderated to be responsive to the traffic encountered. The method of the present invention also reduces oscillation in the transmission rate by being responsive to the characteristics of the network traffic and allowing burst intervals to be borrowed on a periodic basis.

9 Claims, 8 Drawing Sheets

PROCESS FOR IMPROVING THE EFFICIENCY OF HIGH PERFORMANCE ROUTING

BACKGROUND

In packet communications systems, it is common to reserve bandwidth for high priority packets which are then transmitted in preference to lower priority packets or to give preference to high priority packets such as one lower priority packet transmitted after each five high priority packets. Such lower priority traffic therefore must be managed to take advantage of the bandwidth remaining after the higher priority traffic has been served. This remaining bandwidth can vary widely depending on the activity of the high priority traffic and it is therefore of considerable importance to manage the low priority traffic so as to optimize the use of the widely varying additional bandwidth in the network, and, at the same time, avoid congestion in the network which reduces the network throughput.

In packet communication systems, senders are unaware of the level of traffic incident on an intermediate node. It is quite possible that the sum of traffic at some intermediate node may need resources beyond its capabilities. Consequently, the intermediate node will run out of buffers and lose packets, or become a bottleneck in the flow of traffic. It is therefore of considerable importance to manage the traffic so as to optimize the use of the widely varying bandwidth in the network and, at the same time, avoid congestion in the network which reduces the network throughput.

It has become common to utilize window-based flow control mechanisms to reduce congestion in the packet communications network. Such window-based mechanisms pre-allocate receiver buffer credits to packet sources and notify the corresponding sender as to how much data can be sent. Upon detection of congestion, either at an outgoing link (if the receiver is an intermediate node) or within a node, the receiver withholds buffer credits, forcing the sending partner to slow down the launching of packets or to stop transmission altogether. This process, also known as back pressure congestion control, is repeated at each hop of the transmission, eventually reaching the source of the congestion-causing traffic and forcing those sources to slow their transmission.

Such window-based back pressure mechanisms perform efficiently with low speed networks having relatively high bit error rates. However, as network transmission speeds increase, such as with fiber optic networks, the window-based mechanisms no longer perform adequately. The cost of such hop-by-hop method becomes prohibitively expensive and inefficient due to the fact that a sender can send an entire window's worth of data and be required to wait for the receipt of new buffer credits from the receiver before continuing. Furthermore, the window-based flow control does not smooth the transmission of data into the network and hence causes large oscillations in loading due to the clustering of packets, further degrading network performance. Using larger windows merely worsens the degradation.

To better accommodate modern high-speed communications networks, it has been proposed to use an end-to-end congestion control mechanism which relies on the regular transmission of sample packets having time stamps included therein. One such mechanism is disclosed in "Adaptive Admission Congestion Control", by Z. Haas, ACM SIG-COMM Computer Communications Review, Vol. 21(5), pages 58–76, October 1991. In the Haas article, successive time-stamped sample packets are used to calculate changes in network delays which are averaged to represent the state of the network. The averaged network delay is then used to control the admission of packets to the network by controlling the admission rate, either by controlling the inter-packet gap directly, or by adjusting the token rate in a standard leaky bucket scheme at the admission point.

One disadvantage of the Haas congestion control mechanism is that it sends sampling packets at regular intervals regardless of the traffic load from a sender. Sending such sampling packets when the sender is idle is wasted effort and reduces the effective throughput of the system. In addition, the Haas method requires that the system await the arrival of a plurality of sampling packets before initiating congestion control, thus hindering the response time for providing effective flow control as well as congestion control.

Another disadvantage of the Haas scheme is the accumulation effect that it possesses. If the length of queues along the congestion path is built up gradually by small amounts, the overall delay can exceed the threshold allowed for the overall connection without being detected by the endpoint detection scheme. The network can, therefore, become congested without timely correction when using the Haas congestion control scheme.

Still another disadvantage of the Hass method is the fact that the inter-packet control gap is used to control the input packet rate. Sources of short packets are therefore penalized disproportionately compared to sources of long packets when the inter-packet gap control technique of Haas is used to control congestion. Finally, and most important, the Haas congestion control scheme requires relatively frequent transmission of sampling packets to provide timely control information. The overhead from such sampling packets can reach up to twenty percent of the entire throughput of the network, making the Haas congestion control scheme provide lower throughput than an uncontrolled network when the traffic load is less than eight percent. If the transmission rate of Haas' sampling packets were to be reduced to approximate the round trip delay period, on the other hand, the scheme simply would not work at all due to the small quantity of control information available at the sender. That is, the averaging step used to reduce the noise in the control signal would make the scheme so unresponsive to the congestion to be controlled that the low sampling rate would be unable to correct the congestion.

As a result, the Adaptive Rate-Based Congestion and Flow Control method was developed as described in U.S. Pat. No. 5,367,523 entitled "Adaptive Rate-Based Congestion and Flow Control in Packet Communications Networks" assigned to IBM Corporation. The Adaptive Rate-Based Congestion and Flow Control method (ARB) is an end-to-end, closed loop flow and congestion control method for packet networks in which the flow and congestion control is accomplished by calculating, for every requested sampling interval, the lower of either the rate at which the receiver is accepting data from the network (congestion control) or the rate at which the receiver is able to deliver data to the end user (flow control). Thus, the network transfer rate is used to detect congestion while the end user acceptance rate is used to control the flow of data into the network so as not to exceed the user acceptance rate. The lower of these two rates is used to control entry into the network. Such a rate control mechanism is provided for each direction of transmission on each connection, and each end of a connection can request flow and congestion control information by piggy-backing a request for control information on the current data packet being sent to a receiver.

The receiver calculates the network transfer rate by dividing the number of bits received since the last request by the length of the interval since the last request. Rate information is also piggy-backed on data packets for return to the sender. Requests are timed to reflect the data transmittal rate into the network, requests being more frequent when traffic is heavy and less frequent when traffic is light, thus conserving network resources when not needed for flow or congestion control.

More particularly, to implement the ARB flow and congestion control, three different operating modes are defined for the traffic flow control mechanism. The sender uses the traffic feedback information from the receiver to set the sender into one of the three operating modes which, for purposes of this description, will be called the 'green', 'yellow', and 'red' operating modes. The sender is set to the green mode when the rate information received from the receiver indicates that the receiver rate is equal to or greater than the average data input rate at the sender less a sensitivity threshold used to compensate for the accumulated delay effect described above. The sender is set to the yellow operating mode when the received rate is less than the average data input rate less the sensitivity threshold and the sender is set to the red operating mode if a timeout occurs following the expected waiting period for a reply to the most recent request for rate information.

The green operating mode is used when the receiver is able to receive data at a higher rate than the currently permitted rate. In the green operating mode, the sending rate can therefore be increased by some incremental amount which does not exceed the maximum rate which will be tolerated by the network, where the maximum rate is the rate negotiated by the sender when the connection is set up. If the current operating mode is other than green, and the most recent response from the receiver calls for a shift to the green operating mode, the shift is delayed at least one request-response period. This requirement for confirmation of shifts to the green operating mode by at least two responses calling for such a shift prevents oscillation in operating mode due to transients in the data rates.

If the receiving rate returned in the response message is slower than the current sending rate by more than the same sensitivity threshold, the operating mode is set to yellow. In the yellow operating mode, the sending rate is reduced by some reduction factor, preferably not to exceed 10% of its current rate. In the yellow operating mode, it is assumed that the network is saturated and that it can carry no more traffic. The sender continues in the yellow operating mode, reducing the sending rate for each new response message indicating a lower receiving rate than the current sending rate (less the sensitivity threshold) until at least two responses are received dictating the need to shift to the green operating mode.

If a response timeout occurs while the sender is waiting for a response to its most recent request for rate information, the sender immediately assumes that congestion has delayed the response and the sending rate is therefore cut drastically, e.g., by half or to the latest received receiving rate, whichever is lower. The sender remains in the red operating mode until two or more request responses call for a return to the green operating mode.

In accordance with one feature of the ARB mode, the incremental increase in the sending rate during the green operating mode can be defined to be nonlinear to permit rapid increases in sending rate until saturation is approached and, thereafter, the incremental increases can be kept small to avoid wide fluctuations around a desirable operating point. Conversely, incremental decreases in the sending rate during the yellow operating mode can likewise be defined non-linearly to permit small decreases for small departures from an optimal operating point and larger decreases as the departure from the optimal operating point itself increases in magnitude.

The ARB flow and congestion control mechanism is highly adaptive to network conditions in that it is responsive to the offered traffic load and to the congestion. This results in maximizing throughput of the network while at the same time minimizing network congestion. The flow control mechanism also smooths the input traffic to discourage very large data bursts and the large queues which result from large data bursts. The ARB method also provides equal and fair access to all connections regardless of their relative average packet length. It can be modified to provide protection against congestion arising from the accumulation effect. In particular, by keeping track of the delay accumulations in a connection, the reported receiving rate can be adjusted to reduce the accumulated delays.

In the above described implementation of ARB flow and congestion control a few shortcomings have been identified. The first shortcoming is that, when a link along a connection path fails, HPR (High Performance Routing) recovers by determining an alternate route and switching to it. However, typically, when a link is lost, one or more packets in flight are lost, until the breakage is discovered. The packet losses are discovered in exchanges that take place after the path switch is completed. The packet losses have the effect of reducing the send rate of the reestablished connection exponentially (one quarter of the current rate for each packet lost). Furthermore, when a path switch is successfully completed, the rate at which data is allowed to flow is low, until the ARB flow and congestion control mechanism can determine the level of congestion on the new path. The rate reductions caused by packet loss aggravate the condition of slowness in the network, especially in a high-speed network.

An additional shortcoming is that, in some situations, network adapter hardware will discard received frames which causes problems in the ARB mechanism for determining the appropriate flow rate. In fact, on some adapters, when the arrival rate of frames exceeds some threshold, frames are summarily discarded. When frames arrive at a rate below this threshold, the adapter processes them expediently. While the ARB flow control mechanism will initially react appropriately for this condition—that is, adjacent nodes will cut the rate at which frames are sent to this adapter—its long-term behavior is suboptimal due to its inability to correctly compensate for dropped frames.

Consider the following example: on a 16 Mbit/sec token ring, some adapter might drop frames when the data rate exceeds 5 Mbits/sec. Initially, the ARB flow control mechanism will allow a modest send rate, say 1 Mbit/sec, and the send rate will be increased until a problem occurs. In our example, no problem will occur until the ARB mechanism allows a send rate of 5 Mbits/sec. At that rate, the suspect adapter will begin discarding frames until ARB slows the rate at which adjacent nodes send data to this node. Once the ARB flow control mechanism adjusts, the congestion disappears, and the ARB mechanism allows the rate to be increased since there is no indication of congestion. In fact, the ARB mechanism will increase the rate until the problem once again arises. Thus, a cycle will develop of dropped frames, rate cuts, congestion elimination, rate increases, dropped frames. In short, the flow rates will oscillate since the ARB flow control mechanism will never correctly adapt to the loss of frames.

A third shortcoming is that the standard ARB flow control mechanism regulates the send rate using an allowed_send_rate variable. If necessary, transmissions are delayed to keep within the allowed_send_rate parameters. The ARB status messages are exchanged between the computers at the endpoints of a connection to detect network congestion. If no congestion is detected, the allowed_send_rate is incremented in small steps up to a maximum of twice the actual send rate. This way the send rate is ramped up gradually so the congestion can be detected before it becomes severe. The problem is that twice the actual send rate may be too high or too low a number depending on the type of application. Since the measurement interval for computing actual send rate is relatively large, it includes periods during which the application may not be sending. The actual send rate therefore does not represent the send rate during transmission (call this transmission rate) but an average send rate.

If the application sends one half of the time, then the actual send rate equals one half of the transmission rate and allowed_send_rate equals the transmission rate so the formula works well. If the application sends less than one half the time, actual_send_rate is less than one half of the transmission rate which can never be more than the allowed_send_rate. Therefore the actual_send_rate is less than half of the allowed_send_rate and the allowed_send_rate will never be incremented beyond its initial setting. Under these circumstances, the application will be slowed by the ARB mechanism even when there is no network congestion. If the application sends near 100% of the time, the allowed_send_rate will be twice the transmission rate. This could cause flooding of the network if the transmission rate suddenly increases, due to more CPU availability. The goal is to control send rate so as to prevent sudden increases that might cause network congestion without slowing performance when there is no network congestion.

Yet a fourth short-coming is that, in the ARB algorithm, there is a mechanism for metering out data at a specified rate by permitting only b bytes of data out in a time interval t. Thus, if a connection uses up all the allocated bytes in less than t units of time, it will have to wait until those time units elapse before sending more data out. This interval of time is known as the burst interval, and the number of bytes allowed in a burst interval is called the burst size.

The design and simulation of the traditional ARB methodology assumed a very accurate clock and tight CPU scheduling were available. This meant that at the exact moment when a connection was allowed to send data, it would be scheduled to run. This is not true in a general-purpose multi-tasking operating system, like OS/2, where other processes may be scheduled ahead of the ARB process, or when interrupts occur that throw the timing off. As a result, it is possible that when the Rapid Transport Protocol (RTP) component (which implements ARB algorithms) runs, it may decide that the connection has already used up its burst size, and must wait for that burst interval to elapse before being allowed to send again. Due to the vagueness or inaccuracies of scheduling, it is possible that this occurs just a few milliseconds later. However, because the RTP component vies for CPU time along with other processes, the scheduler may not reassign the CPU to the RTP process for some time. Thus, that particular connection's sending status will not be updated, and even if the application using the connection has data ready to send, the data will be blocked until the burst size is reset, and the new burst interval is allocated. This can reduce the effective throughput of the system.

A fifth area of concern with the ARB flow and congestion control mechanism is that, in reliable communications protocols such as RTP, verification that data was received is accomplished when the sender transmits an acknowledgement request and the receiver transmits an acknowledgement reply. In RTP these are called status requests and status replies. The status request and status reply can accompany a data packet or they can be transmitted separately. The goal is to minimize the number of status requests and replies transmitted separately because these increase network traffic and CPU usage, thereby reducing the network capacity and application performance.

As is shown in FIG. 1, when multiple data packets are transmitted consecutively from computer "A" to computer "B" status responses can be reduced if "A" sends only one status request with the last frame of the sequence.

The problem is that the RTP implementation does not know when the sequence ends. This is determined by the application. The application passes data to RTP and it transmits it. The application may pass more data to RTP immediately or may wait for an undetermined amount of time before passing any more data. In transaction type applications, for example, application "A" will send data and then wait until application "B" sends data back. Since the RTP implementation cannot determine if there is an additional data packet in the sequence, it must request status with every packet sent, therefore creating further congestion in the network.

SUMMARY OF THE INVENTION

The present invention provides a means for solving the above identified shortcomings by utilizing sequence numbers for the transmission of HPR packets. In addition, the rate adaptation for lost frames is modified such that the 'acceleration' is controlled by cutting the acceleration each time a frame is lost. An additional benefit of the present invention is that a more appropriate send rate is determined by using feedback from the rate overrun conditions to trigger increases in the allowable send rate. Yet another benefit of the present invention is to allow anticipation of the expiration of the burst interval and to accommodate for scheduling delays. A final benefit of the present invention is to reduce the acknowledgment traffic required by ARB flow and congestion control.

DETAILED DESCRIPTION OF THE PREFERRED EMBODIMENT

The present invention is herein described by example of its implementation into a preferred embodiment. It provides a solution to the above-mentioned short-comings for the ARB flow and congestion control mechanism.

In the system of the present invention, every HPR packet that is sent on the network has a sequence number that is unique and increasing in order of transmission. In this way, packets that are received from the network out of order can be delivered to the receiving application in their appropriate order. In addition, HPR can recover from lost packets by requesting selective retransmission of the packets whose sequence numbers are missing.

In the system of the present invention, when an HPR endpoint discovers the path is broken, the sequence number is recorded to a predetermined place in storage. Since HPR will not send packets after the path breakage is detected, and until the path switch is completed, this sequence number at path switch initiation marks which packets could potentially have been lost just after the link broke. Thus, in the retransmission phase that the sender executes to retransmit the lost packets, the ARB algorithm will not decrement the allowed send rate if the requested packets have a sequence number that is less than the sequence number at path switch.

Figure 1:
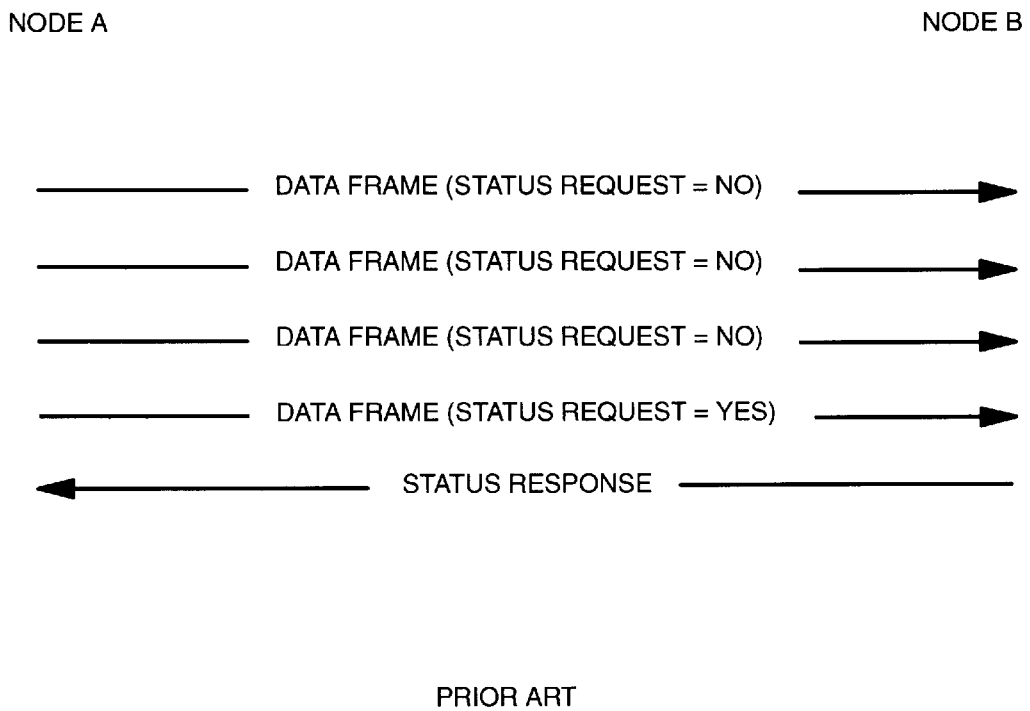
Figure 2:
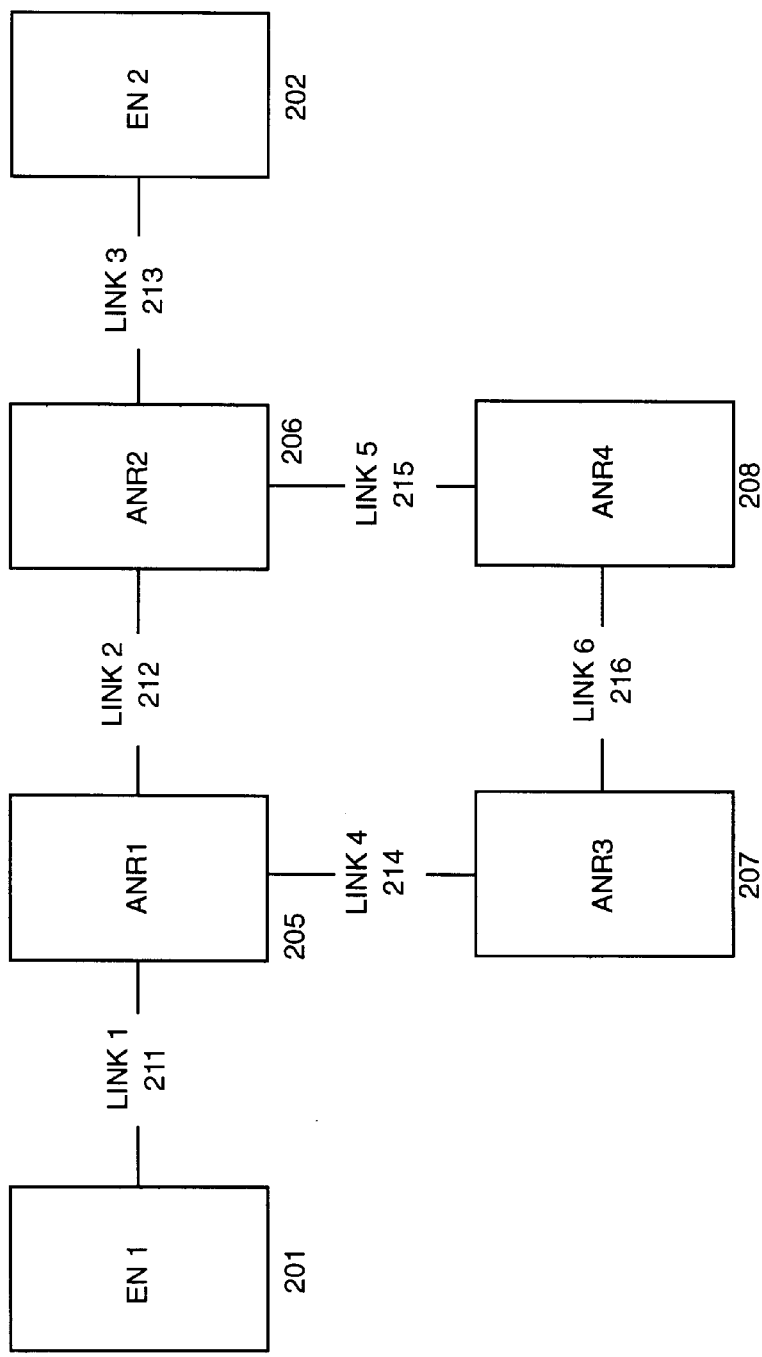

Consider the following scenario where the problem arises along with an illustration of the implementation of the present invention shown in FIG. 2. EN1 201 and EN2 202 are the two endpoints of the HPR connection, connected through two intermediate nodes ANR1 205, and ANR2 206. The nodes are connected through links Link1 211, Link2 212, and Link3 213 as in a standard configuration. An alternate route, say through ANR3 207 and ANR4 208 using Link4 214, Link5 215, and Link6 216 instead of Link2 212.

Figure 3A:
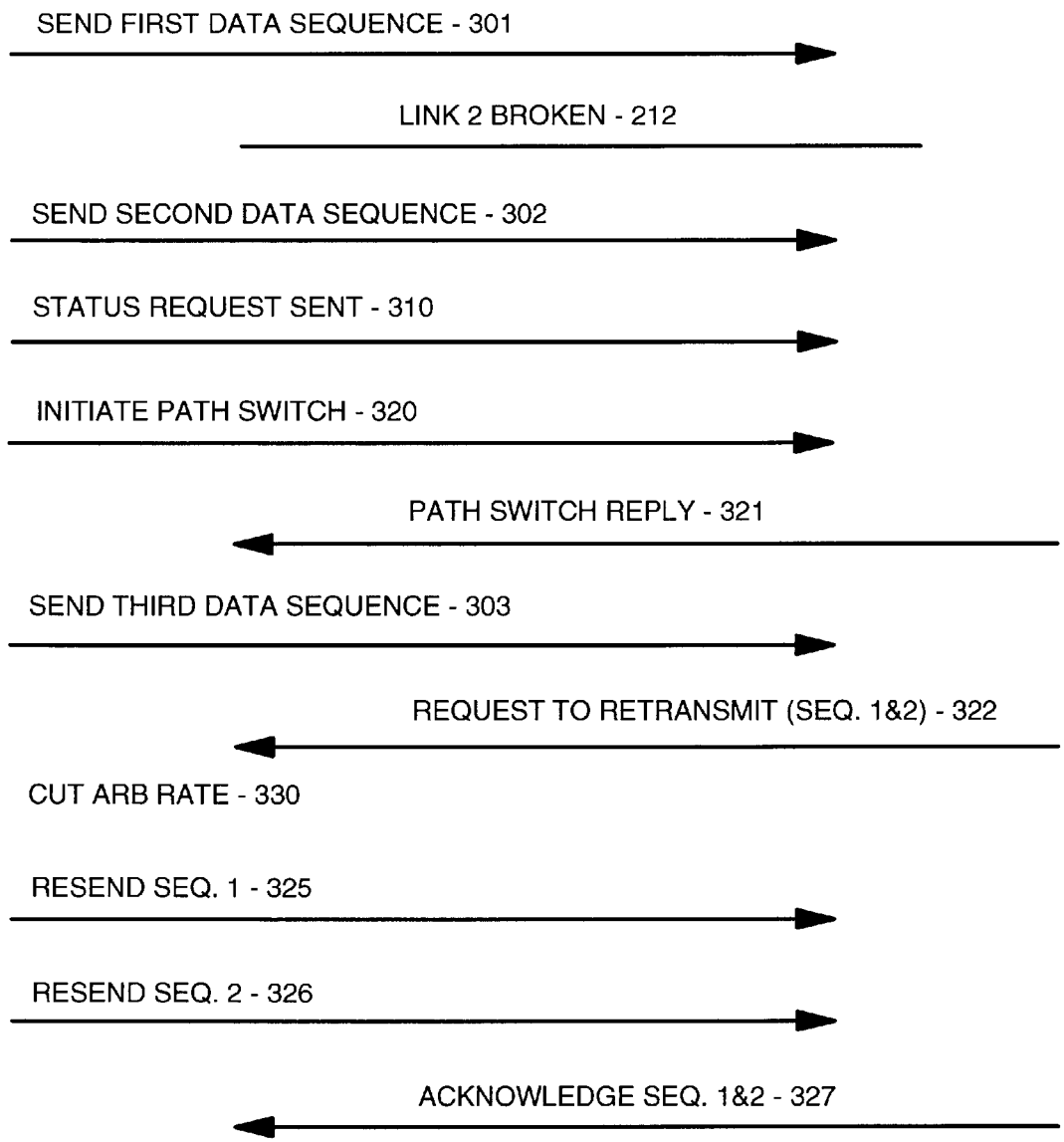

Prior to the present invention, a problem may arise as described in FIG. 3A. If a first data sequence 301 is sent from EN1 201 to EN2 202 over a link, say Link2 212, then Link2 212 is broken, then a second data sequence is sent 302 over the same Link2 212 and there is no confirmation of receipt, EN1 201 will begin sending status requests to EN2 202. Then sending node 201 will send a status request 310 to the receiving node 202 over the chosen Link 212. Since this link is broken, there will be no response. After a predetermined amount of time the status request will time out and another status request 311 will be sent. In the preferred embodiment, six status requests are sent and each of them, under the above described conditions, will time out without response. Once the status requests have all timed-out, the sender 201 initiates a path switch 320. The receiving node 202 responds 321 through the newly initiated path 321 and the next data sequence 303 is sent. When the receiving node 202 realizes that it has not received the first data sequence 301 and the second data sequence 302, it sends the sending node 201 a retransmit request 322 for those data packets. The sending node 201, determining that the packets have been lost, initiates a rate reduction 330 for the sending of information since it assumes that the packets were lost due to congestion. The sending node then resends the first data sequence 325 and the second data sequence 326, then the receiving node acknowledges the receipt of the missing packets 327.

Figure 3B:
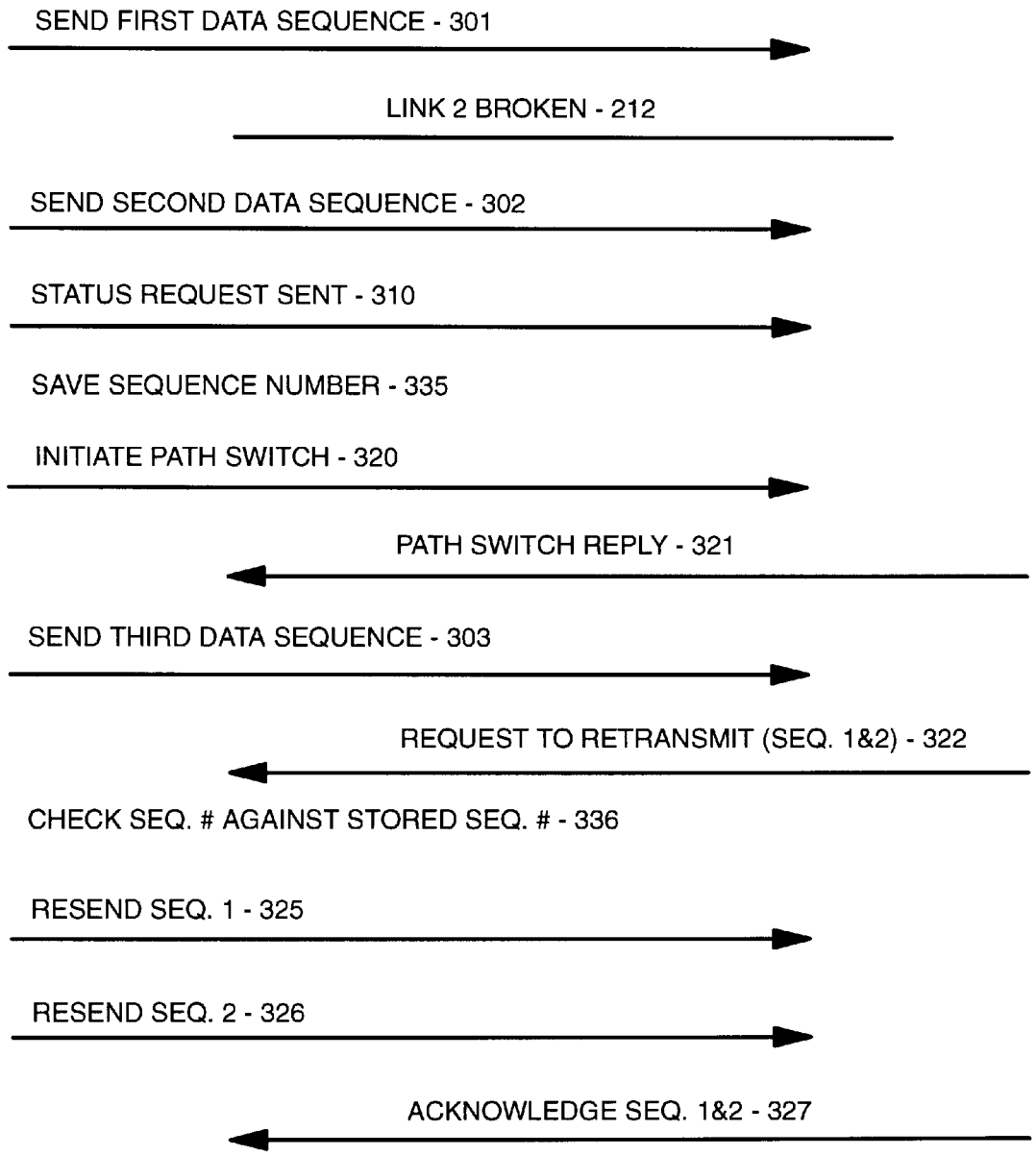

In the present invention, as shown in FIG. 3B, when the status request has been sent the predetermined number of times and it is determined that there is a transmission problem, the sending node stores the sequence indicator 335 of the most recently sent data sequence prior to initiating the path switch. Since any new packets which are sent after the path switch will have a sequence number greater than that stored when the path switch was initiated, the sender will know that any lost packets with sequence numbers less than or equal to the stored sequence number are due to the damaged transmission link and are not relevant to the current, alternatively routed transmission path. When the request is sent from the receiver to retransmit the first data sequence 301 and the second data sequence 302 their respective sequence numbers are checked 336 against the sequence number stored at the sending node 201 prior to the path switch. Since they are less than or equal to what was stored prior to the path switch, the ARB flow control method of the present invention will leave the transmission rate unaffected.

An additional benefit of the present invention is the control of rate acceleration after a frame loss has been detected. In the base ARB mechanism, the acceleration of the data rates is unaffected by a rate cut. Hence, this too, can result in great oscillation or fluctuation in the data rates. In the present invention, each time a frame is lost, the send rate at which the frame loss is recorded. The send rate of consecutive frame losses is compared and, if it is within a narrow tolerance of the same rate, then the acceleration rate is cut for that particular session. This becomes clearer by way of example. Using the present invention, each time a frame is lost, the send rate is cut to a percentage of its previous value, say A%, and the acceleration is cut to a percentage of its previous value, say B%. Assuming the following parameters:

The media rate is 16 Mbits/sec;
One adapter in the path loses frames if the arrival rate exceeds 5 Mbits/sec, i.e., its frame-drop point is 5 Mbit/sec.;
The initial send rate is 1 Mbit/sec;
The initial "acceleration" is 1 Mbit/sec if 16 frames are transmitted without a delay.

When 16 frames are sent without causing a delay, we'll call it a "optimistic interval." After the first optimistic interval, the allowed send rate will be 2 Mbit/sec. After three additional optimistic intervals, the allowed send rate will be 5 Mbits/sec, and the adapter will be vulnerable. Soon, the adapter will lose a frame, and the allowed send rate will be cut to (say) 4 Mbits/sec, and the acceleration to 0.5 Mbits/sec/optimistic interval.

After two more optimistic intervals, another loss will occur. (Contrast that to one optimistic interval without applying this invention.) The rate will again be cut to 4 Mbit/sec and the acceleration to 0.25 Mbits/sec/send block. Now, it takes four optimistic intervals to reach the frame-drop point. After the next round, it will take eight, then 16, then 32, and so on. In general, the allowed send rate will approach the frame drop point exponentially slower. This is a significant improvement in controlling the oscillation of the network while still allowing the flexibility of a node to increase its sending rate under good conditions. This is shown graphically in FIG. 4A.

Figure 4A:
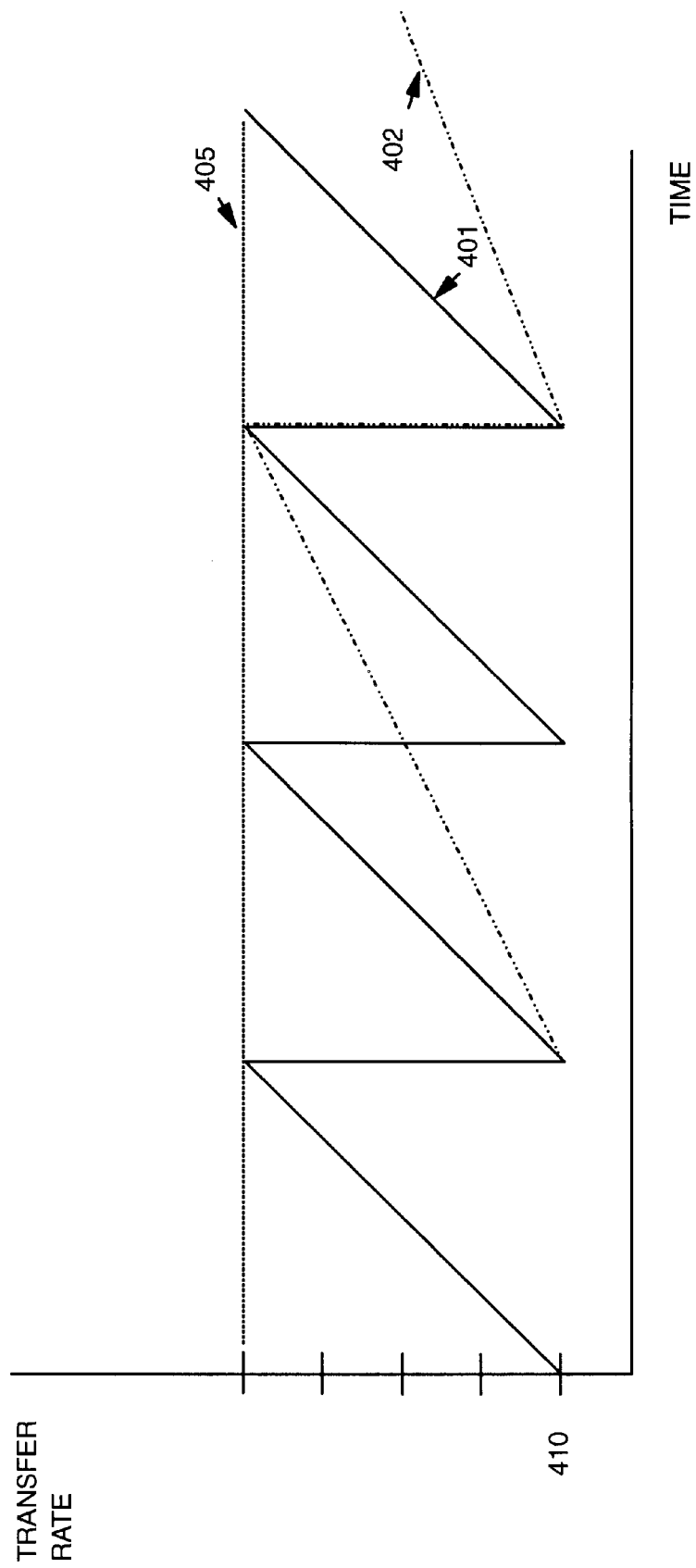

FIG. 4A is a graph showing the transfer rate over time. The frame drop point is shown as 405. The starting point for frame transfer is depicted as 410. As successive optimistic intervals of frame transfer are achieved, the frame transfer rate is increased until the frame drop point 405 is encountered. Once a frame loss is detected, the transfer rate is reduced and the process of counting optimistic intervals is restarted as is indicated by line 401. Line 402 indicates an improvement indicated by the present invention. Line 402 indicates that, each time the frame loss is detected, the acceleration rate is cut by a percentage of the original acceleration rate (in the preferred embodiment, this is 50%). This results in the frame drop point being reached much slower and reduces the amount of oscillation of traffic in the network.

Figure 4B:
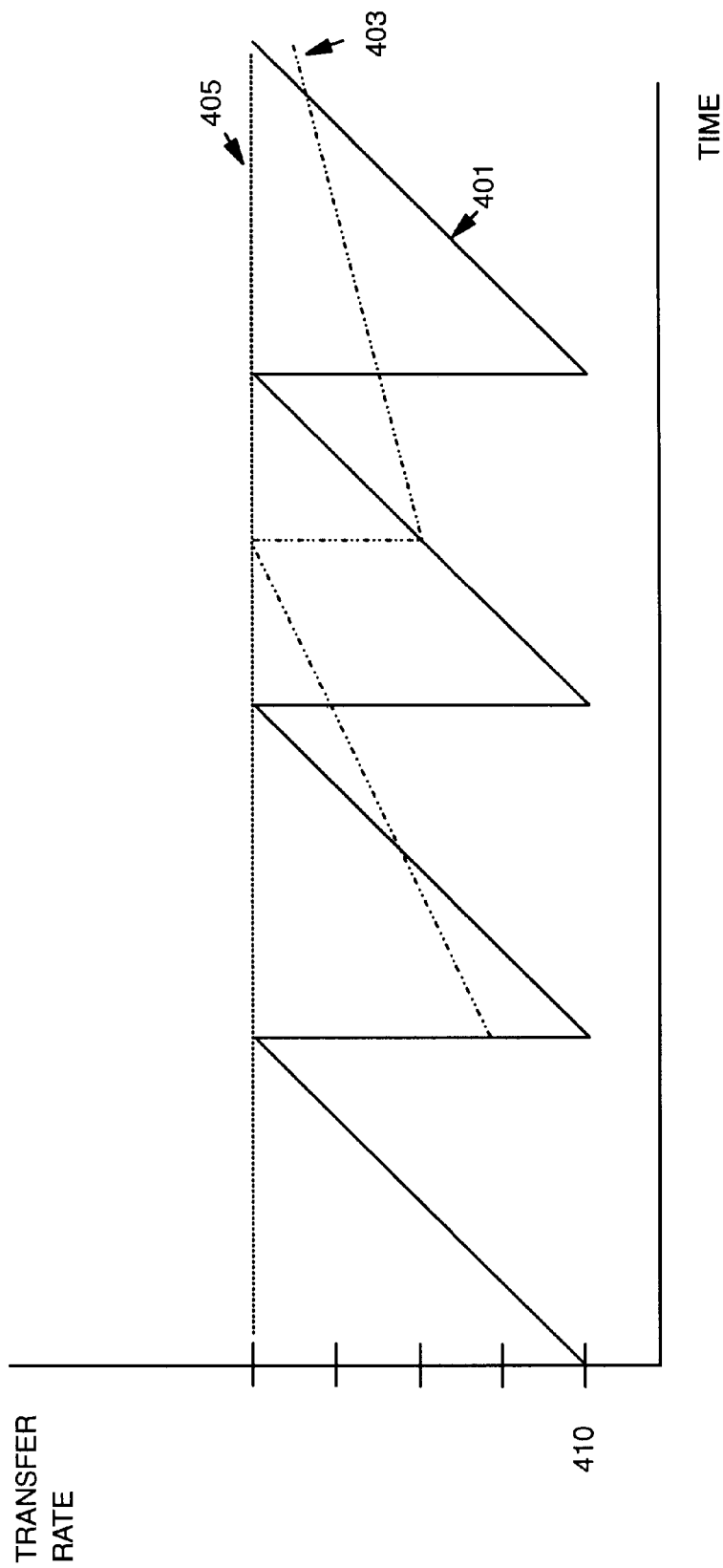

This process can be further improved by gradually reducing the rate cut after a lost frame when this circumstance is detected as is shown in FIG. 4B. In this embodiment, when a frame is lost by a partner, the send rate is recorded. When the next frame is lost, that send rate is compared to the rate at the previous loss. If the two rates are equal (or within a very small tolerance level of each other) then the rate cut is reduced (for example, by 10%) until it reaches some minimal reduction (say 2%).

In the above example of FIG. 4B, after the second loss at 5 Mbit/sec, the rate would be cut to, say, 4.2 Mbit/sec as depicted by line 403. After the third loss at 5 Mbit/sec, the send rate would be cut only to 4.4 Mbit/sec. Over time, the send rate will converge to just below 5 Mbit/sec.

The present invention also utilizes feedback from rate overrun conditions to trigger increases of allowed_send_rate rather than attempting to compute the "ideal" rate with a predetermined formula as is done in the base ARB methodology. By computing the allowed_send_rate based on feedback from the overrun conditions, the allowed_send_rate is increased just to the threshold of rate overrun conditions, prior to where the overrun would occur. A rate overrun is when a transmission must be delayed by the ARB mechanism to stay within the allowed_send_rate. This is implemented by counting the number of rate overruns between the ARB status messages. If, when an ARB status reply is received indicating that there is no network congestion, there have been no rate overruns, then the allowed_send_rate is incremented.

When there is no network congestion, the allowed_send_rate stabilizes at the lowest value that does not slow performance of the ARB implementation. This prevents sudden increases in transmission rate without slowing performance when there is no network congestion. Note that this solution does not affect the line protocol or require any change to the partner implementation. It results in better performance and stability than the base ARB implementation. This solution controls the rate appropriately for any type of application behavior whereas the original ARB algorithm works optimally only when the application transmits half the time.

An additional problem that is solved by the present invention is that of burstiness in the ARB flow control mechanism when utilized with the OS/2 scheduler. Since the OS/2 scheduler is a burst timer, the traffic sent utilizing the ARB methodology on the OS/2 operating system tends to be bursty.

One solution to this problem is to anticipate the expiration of the burst interval, and to accommodate for scheduling delays. Thus, the RTP process may run at time T. When the RTP process runs, it checks the connection sending status at that time. If it is determined that the burst interval has not yet elapsed the present invention becomes relevant. The controlling mechanism (in the preferred embodiment, the RTP process or Rapid Transit Protocol process of the ARB) will not determine definitively that the sending status should remain the same. In the present invention, the controlling mechanism will determine the amount of time remaining before the burst interval is set to expire, then, based on the granularity of the system scheduler, it will reset the sending status.

This solution appears simplistic in that it results in derailing the basic principle of regulated send rates. An example will demonstrate both the problem in the context of OS/2 scheduling and the flaw in the base ARB implementation.

Consider a connection for which RTP has determined the current allowed send rate is 128 KB/s and the burst size is 8 kilobytes, then the equation:

rate=burst size/burst interval=8,000/128,000=0.0625 sec.

determines that the burst interval should be 62.5 milliseconds. Assume that 10 milliseconds after the burst interval starts, the entire 8 KB burst size has been used up. Also, assume that RTP checks the connection 40 milliseconds after the burst interval has elapsed, and determines that the burst interval has not yet elapsed. It could leave the connection as is, until the next time that RTP runs. Given that the OS/2 scheduling interval is 32 milliseconds, RTP may not run until 32 milliseconds (or more) have elapsed. This means that the connection may possibly be blocked for at least 10 milliseconds (since 22 milliseconds are left for the burst interval to elapse, and 10 more milliseconds would be needed for RTP to run again). This is the problem that is addressed by the present invention.

Assuming that it is known that the RTP process will run again in 35 milliseconds, then, 40 milliseconds into the burst interval, the RTP process could reset the sending state of the connection so that it will be allowed to send again. While this achieves one desired goal that, if the application wants to send on that connection, it can, it defeats another purpose of the RTP process, namely that of metering out data at a rate that has been determined to be appropriate for the congestion level in the network. What has resulted from the above is that the burst interval has become 40 milliseconds, rather than 62.5 milliseconds, and the send rate has thus become 200 KB/s rather than 128 KB/s (based on rate=8 KB/40 milliseconds). By allowing the application to send after 40 milliseconds, we have increased the send rate that was determined to be appropriate by the RTP process. Since this could happen again on the next burst, and all future bursts, the "good network citizen" behavior that the RTP process was trying to implement to avoid network congestion has been circumvented.

A further solution to this problem is to make the next burst interval (the one following the burst interval that was just shortened) longer, so that if the current burst interval is cut to 40 milliseconds, then the next burst interval is extended by an extra 22.5 milliseconds (the amount of reduction in the current burst interval). This again surfaces an inherent problem in that it makes traffic bursty. For one shortened burst interval during which the entire burst was sent quickly, there is a corresponding extra long burst interval. Bursty traffic also causes momentary symptoms of network congestion which could trigger other flow control problems.

To smooth out the burstiness, the choice of how soon to anticipate that the RTP process will run again is important. For example, it may be decided that, since the RTP process will run again in 50 milliseconds, the RTP process should reset the send state. That means that the first shortened burst interval could be as small as (62.5−50=12.5 milliseconds) long. This would be followed by a burst interval of (62.5+50=112.5 milliseconds) long. To avoid this burstiness, it has been determined experimentally that the RTP process should anticipate that it will run next every scheduling interval, which is about 32 milliseconds on OS/2. This process, where the RTP process checks for burst intervals which expire at a time, Tb, has been called "borrowing time".

When borrowing time, the RTP process:
Checks whether the burst interval will expire in less than one scheduling interval. i.e., (Tb−time_now) <scheduling interval
If yes, then start a new burst interval, which expires at (Tb+b) time, i.e., a burst interval after the current burst should have expired.
If not, then don't reset the sending state of the connection.

Figure 5:
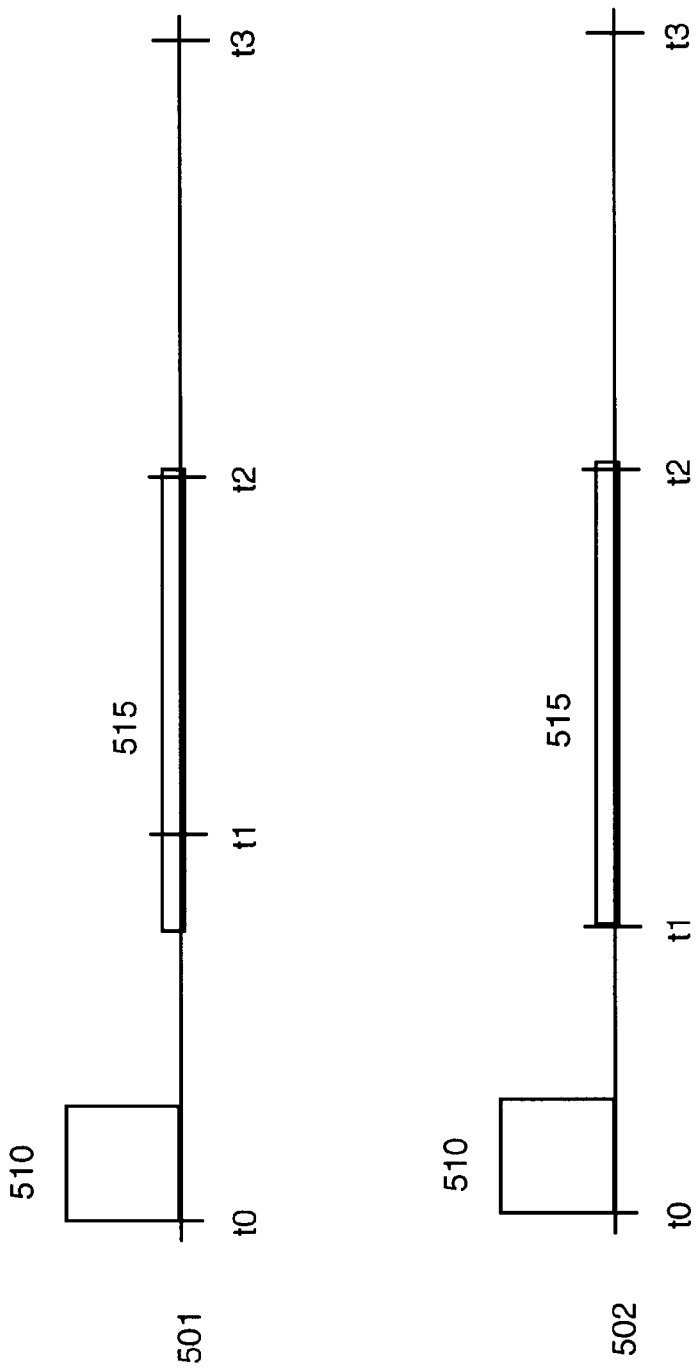

This is demonstrated in FIG. 5. Line 501 shows the rate at which the data becomes available for sending. Both packets 510, 515 become available for sending in time frame t0. Using the time borrowing algorithms of the present invention, the time interval t1 is able to be shifted earlier so that each of the packets 510, 515 can be sent within a single burst interval. This is achieved by shortening the time interval t0 and increasing the time interval t1.

An additional concern for borrowing time is that it should not be done too often. In the preferred embodiment, the application is not allowed to borrow time for two consecutive intervals, although any method of monitoring and restricting the frequency of borrowing time is applicable.

Figure 6:
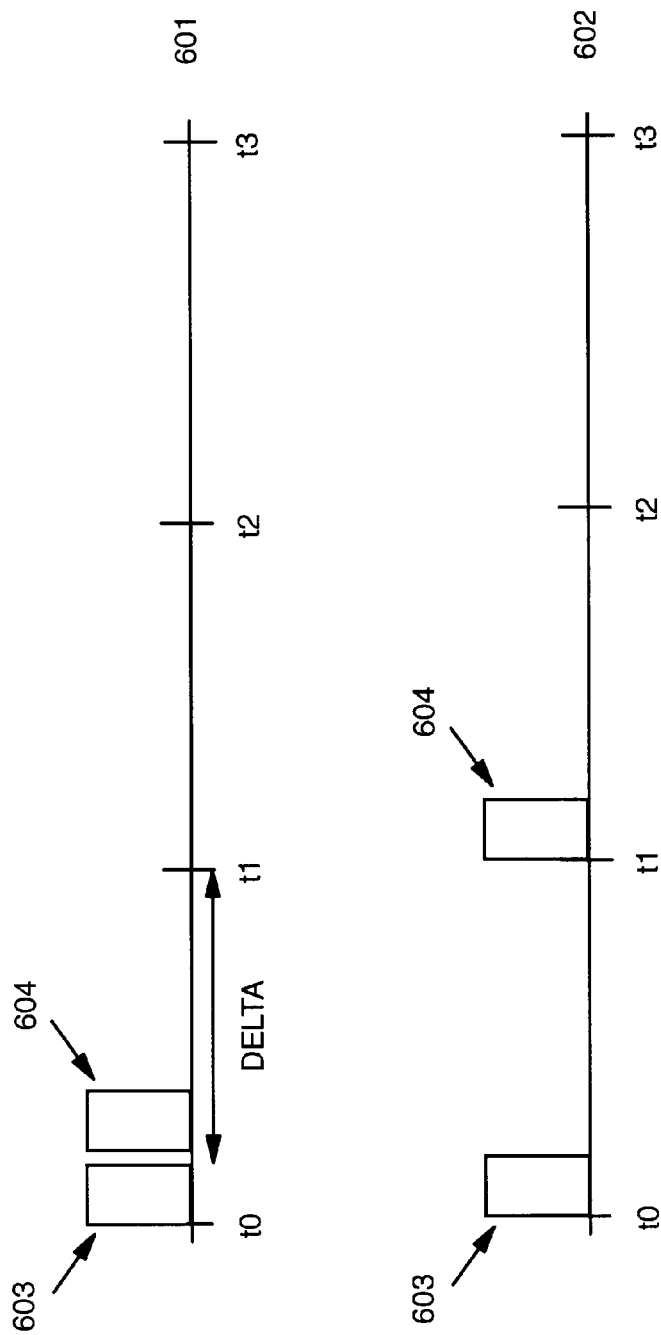

An additional restriction that should be implemented concerning borrowing time is that the time should not be borrowed 'too early' in the burst interval. If the process allows for borrowing time 'too early', then there is a risk of having closely spaced, high volume bursts with large silent intervals interspersed. This increases the probability of congestion if multiple hosts are using this methodology and, at a minimum, can cause oscillation of the network traffic. This is demonstrated by the example of FIG. 6. Line 601 shows the times when the packets 603,604 are introduced into the system and made available for transmission. Since the packets of information are available so close together in time, there is an indication that the network could become congested. Hence, a solution to this problem is that some percentage of the burst interval is chosen such that, if the difference between the current time t0 and the next burst interval t1 is greater than a predetermined amount of time, as is shown on line 601, then the packet should be held until its regularly scheduled burst interval as is shown on line 602.

A second improvement to the algorithm which corresponds with borrowing time is "Paying back time." It is possible that the RTP process runs more than one scheduling interval before the expiration of the burst interval. But, even though it is anticipated that the RTP process will run again in a scheduling interval, and thus before the expiration of the current burst interval, the load on the system is very high, and the RTP process does not get to run until some time into the next burst. If this is the case, then the connection send state gets reset too late. Effectively, this means that in the last interval, the send rate was low, because the burst interval was larger. To make up, the subsequent burst interval is shortened a corresponding amount. In the example above, if the RTP process ran 20 milliseconds into the burst interval, it would not reset the connection send state and start a new burst interval, because there are (62.5−20=42.5 milliseconds) left in the current burst interval, and OS scheduling interval is 32 milliseconds. However, say that the RTP process runs after 50 milliseconds, so that 7.5 milliseconds of the next burst interval have been lost. If the RTP process just starts a new burst interval of size b then the effect is to cause the previous burst to be an extra 7.5 milliseconds long. To fix this problem, the new burst interval is made 7.5 milliseconds shorter, so that the average rate of the connection can be maintained.

What is claimed is:

1. A closed loop rate-based flow and congestion control system for a packet communications network providing a connection for the transmission of packets between a sending end node and a receiving end node of said network, each of said packets having an associated sequence number, said control system comprising:

means at said receiving end node for determining the lower of either the rate at which said packets are delivered from said network to said receiving end node or the rate at which said packets are delivered from said receiving end node to a connected user;

means for transmitting said lower rate from said receiving end node to said sending end node of said network; and means for adjusting the rate at which packets are launched from said sending end node on said connection in response to said lower rate, said means for adjusting comprising:

means for switching to an alternate path if said connection between said sending end node and said receiving end node is disrupted;

means at said sending end node to record a sequence number associated with the last packet sent prior to the switch to said alternate path;

means at said receiving end node of determining if one or more of said packets were sent from said sending end node and not received at said receiving node, thereby being lost;

means at said receiving end node for requesting that the sending end node resend any of said lost packets; and, means at said sending end node for comparing the sequence numbers of said lost packets with said recorded sequence number and, only if said sequence numbers of said lost packets are greater than said recorded sequence number said sending end node reduces said transmission rate of said network.

2. A closed loop rate-based method for controlling data packet flow and congestion in a packet communications network providing a connection for the transmission of packets between a sending end node and a receiving end node of said network, said method comprising the steps of:

determining at said receiving end node the lower of either the rate at which said packets are delivered from said network to said receiving end node or the rate at which said packets are delivered from said receiving end node to a connected user;

transmitting said lower rate from said receiving end node to said sending end node of said network; and, adjusting the rate at which the packets are launched from said sending end node on said connection in response to said lower rate, said adjusting step comprising the steps of:

switching to an alternate path if said connection between said sending end node and said receiving end node is disrupted;

recording, at said sending end node, a sequence number associated with the last packet sent prior to the switching to said alternate path;

determining, at said receiving node, if one or more of said packets were sent from said sending end node and not received at said receiving end node, thereby being lost;

requesting, but the receiving end node, that the sending end node resend any lost packets; and, comparing, at said sending end node, the sequence numbers of said lost packets with said recorded sequence number and, only if said sequence numbers of said lost packets are greater than said recorded sequence number, said sending end node reduces said transmission rate of said network.

3. A media containing programmable software implementing a closed loop rate-based flow and congestion control system for a packet communications network providing a connection for the transmission of packets between a sending end node and a receiving end node of said network, each of said packets having an associated sequence number, said control system comprising:

programmable means at said receiving end node for determining the lower of either the rate at which said packets are delivered from said network to said receiving end node or the rate at which said packets are delivered from said receiving end node to a connected user;

programmable means for transmitting said lower rate from said receiving end node to said sending end node of said network; and programmable means for adjusting the rate at which packets are launched from said sending end node on said connection in response to said lower rate, said programmable means for adjusting comprising:

programmable means for switching to an alternate path if said connection between said sending end node and said receiving end node is disrupted;

programmable means at said sending end node to record a sequence number associated with the last packet sent prior to the switch to said alternate path;

programmable means at said receiving end node of determining if one or more of said packets were sent from said sending end node and not received at said receiving node, thereby being lost;

programmable means at said receiving end node for requesting that the sending end node resend any of said lost packets; and, programmable means at said sending end node for comparing the sequence numbers of said lost packets with said recorded sequence number and, only if said sequence numbers of said lost packets are greater than said recorded sequence number said sending end node reduces said transmission rate of said network.

4. A closed loop rate-based flow and congestion control system for a packet communications network providing a connection for the transmission of packets between a sending end node and a receiving end node of said network, each of said packets having an associated sequence number, said control system comprising:

means at said receiving end node for determining the lower of either the rate at which said packets are delivered from said network to said receiving end node or the rate at which said packets are delivered from said receiving end node to a connected user;

means for transmitting said lower rate from said receiving end node to said sending end node of said network; and means for adjusting the rate at which packets are launched from said sending end node on said connection in response to said lower rate, said means for adjusting comprising:

means for switching to an alternate path if said connection between said sending end node and said receiving end node is disrupted;

means at said sending end node to record a sequence number associated with the last packet sent prior to the switch to said alternate path;

means at said receiving end node of determining if one or more of said packets were sent from said sending end node and not received at said receiving node, thereby being lost;

means at said receiving end node for requesting that the sending end node resend any of said lost packets; and, means at said sending end node for comparing the sequence numbers of said lost packets with said recorded sequence number and, only if said sequence numbers of said lost packets are greater than said recorded sequence number said sending end node reduces said transmission rate of said network.

5. A closed loop rate-based flow and congestion control system for a packet communications network providing a connection for the transmission of packets between a sending end node and a receiving end node of said network, said control system comprising:

means for adjusting the rate at which packets are launched from said sending end node on said connection, said means for adjusting comprising:
means for setting an initial sending rate;
means for defining an optimistic interval in terms of number of frames or packets transmitted without error or delay;
means for defining an acceleration increment;
means for defining a noise tolerance for said rate at which packets are launched;

means for determining when an optimistic interval has been obtained and, incrementing said sending rate by said acceleration increment in response to obtaining said optimistic interval;
means for determining when a packet is lost in said transmission and recording said send rate; and,
means for decrementing said sending rate by a predetermined amount in response to a predetermined consecutive number of said lost packets within said noise tolerance of said sending rate and, correspondingly, decrementing said acceleration increment by a percentage of said previous acceleration increment.

6. A closed loop rate-based flow and congestion control method for a packet communications network providing a connection for the transmission of packets between a sending end node and a receiving end node of said network, said method comprising the steps of:

adjusting the rate at which packets are launched from said sending end node on said connection, said adjusting comprising:
setting an initial sending rate;
defining an optimistic interval in terms of number of frames or packets transmitted without error or delay;
defining an acceleration increment;
defining a noise tolerance for said rate at which packets are launched;
determining when an optimistic interval has been obtained and, incrementing said sending rate by said acceleration increment in response to obtaining said optimistic interval;
determining when a packet is lost in said transmission and recording said sending rate; and,
decrementing said sending rate by a predetermined amount in response to a predetermined consecutive number of said lost packets within said noise tolerance of said sending rate and, correspondingly, decrementing said acceleration increment by a percentage of said previous acceleration increment.

7. Media containing programmable software comprising a closed loop rate-based flow and congestion control system for a packet communications network providing a connection for the transmission of packets between a sending end node and a receiving end node of said network, said control system comprising:

programmable means for adjusting the rate at which packets are launched from said sending end node on said connection, said programmable means for adjusting comprising:
programmable means for setting an initial sending rate;
programmable means for defining an optimistic interval in terms of number of frames or packets transmitted without error or delay;
programmable means for defining an acceleration increment;
programmable means for defining a noise tolerance for said rate at which packets are launched;
programmable means for determining when an optimistic interval has been obtained and, incrementing said sending rate by said acceleration increment in response to obtaining said optimistic interval;
programmable means for determining when a packet is lost in said transmission and recording said sending rate; and,
programmable means for decrementing said sending rate by a predetermined amount in response to a predetermined consecutive number of said lost packets within said noise tolerance of said sending rate and, correspondingly, decrementing said acceleration increment by a percentage of said previous acceleration increment.

8. A closed loop rate-based method for controlling data packet flow and congestion in a packet communications network providing a connection for the transmission of packets between a sending end node and a receiving end node of said network, said method comprising the steps of:

determining a burst interval for said sending end node;

determining a burst size for said sending end node;

determining, when a packet is available for sending, whether the packet is capable of being sent within a next burst interval; and, borrowing time from the next burst interval of said sending end node, thereby allowing said packet to be sent during a current burst interval if said packet can be sent in its entirety within the next burst interval and a burst interval immediately previous to said current burst interval has not borrowed time.

9. A closed loop rate-based method for controlling data packet flow and congestion in a packet communications network providing a connection for the transmission of packets between a sending end node and a receiving end node of said network, said method comprising the steps of:

determining a burst interval for said sending end node;

determining a burst size for said sending end node;

determining, when a packet is available for sending, whether the packet is capable of being sent within a next burst interval; and, borrowing time from the next burst interval of said sending end node, thereby allowing said packet to be sent during a current burst interval if said packet can be sent in its entirety within the next burst interval and a burst interval immediately previous to said current burst interval has not borrowed time.

* * * * *